(No Model.) 3 Sheets—Sheet 1.
M. FRY.
GRASS GATHERING ATTACHMENT FOR LAWN MOWERS.
No. 505,310. Patented Sept. 19, 1893.
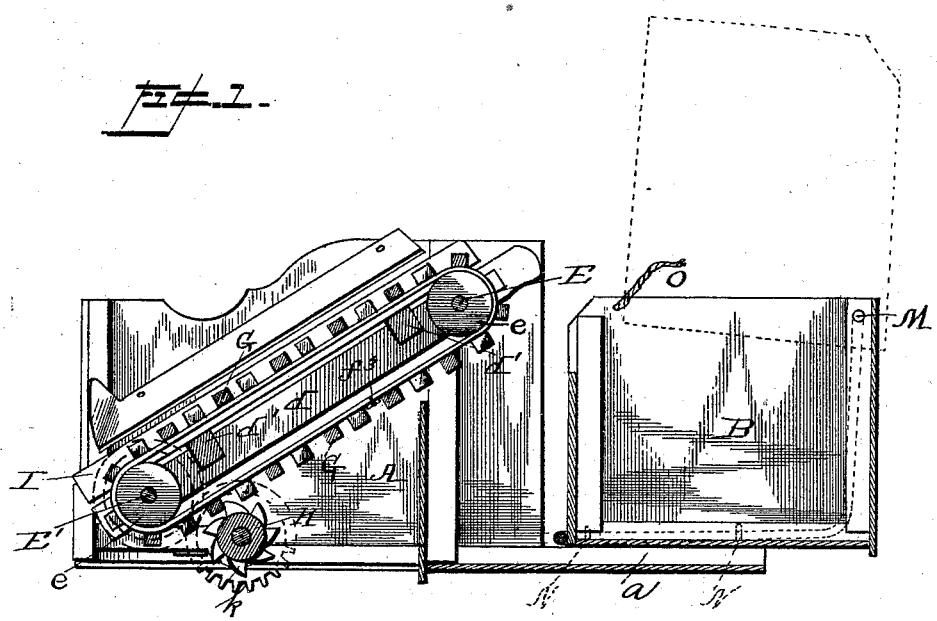
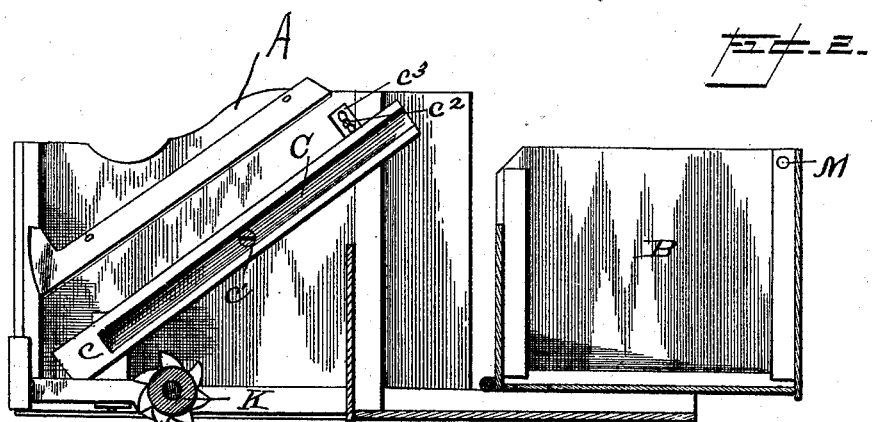
WITNESSES
INVENTOR
Michael Fry
Ruff + Johns
Attorneys (No Model.) 3 Sheets—Sheet 2.
M. FRY.
GRASS GATHERING ATTACHMENT FOR LAWN MOWERS.
No. 505,310. Patented Sept. 19, 1893.
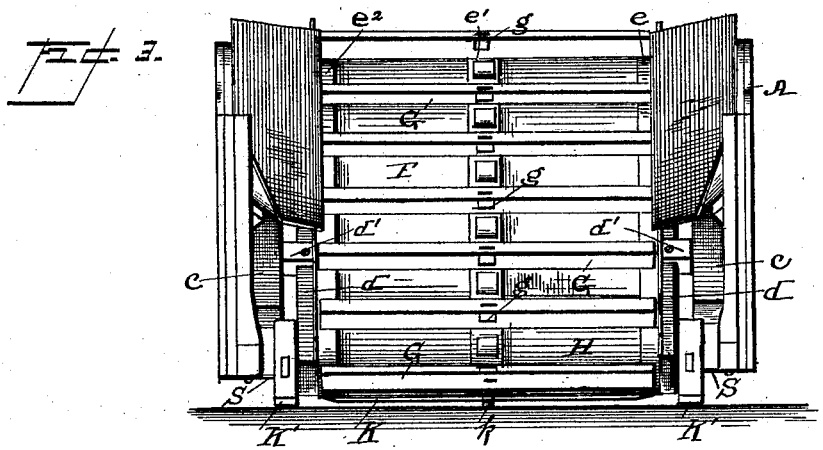
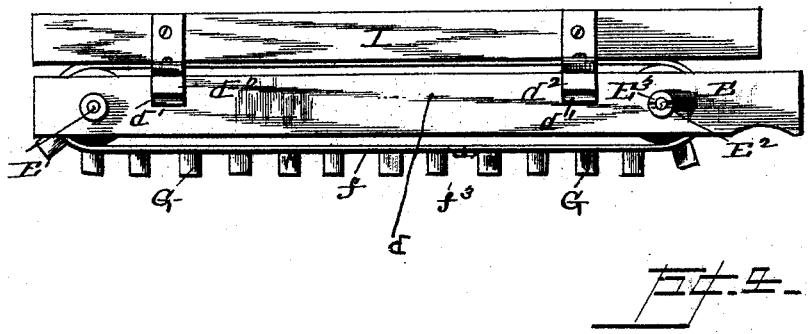
WITNESSES
INVENTOR (No Model.) 3 Sheets—Sheet 3.
M. FRY.
GRASS GATHERING ATTACHMENT FOR LAWN MOWERS.
No. 505,310. Patented Sept. 19, 1893.
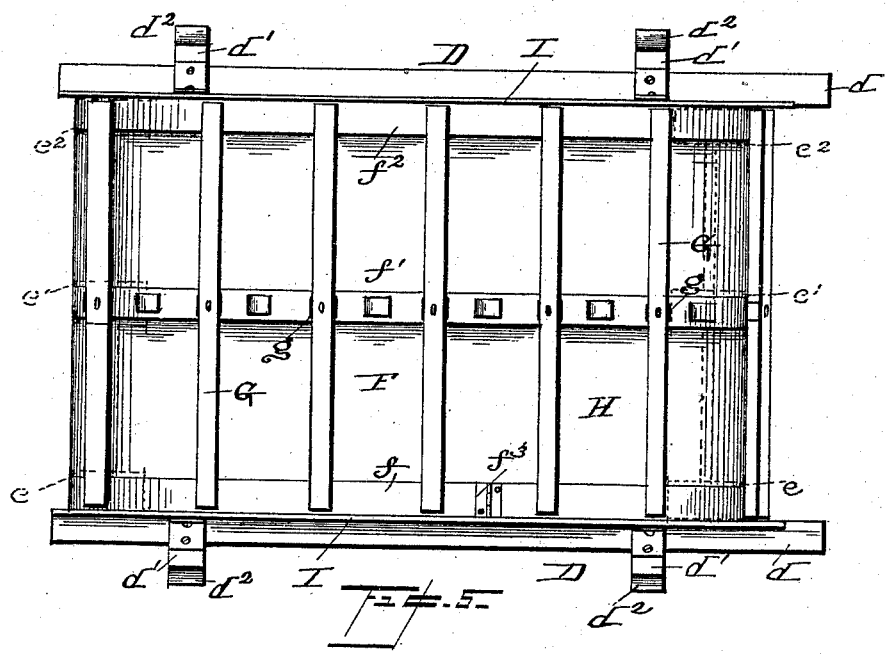
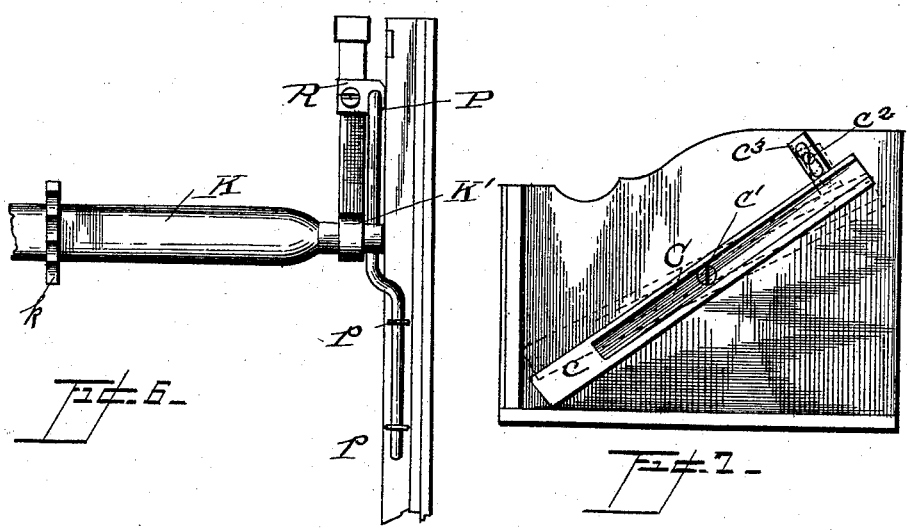
WITNESSES
INVENTOR
Michael Fry
By Ruff + Johns
Attorneys

UNITED STATES PATENT OFFICE.

MICHAEL FRY, OF BLOOMINGTON, ILLINOIS.

GRASS-GATHERING ATTACHMENT FOR LAWN-MOWERS.

SPECIFICATION forming part of Letters Patent No. 505,310, dated September 19, 1893.

Application filed March 21, 1893. Serial No. 467,038. (No model.)

*To all whom it may concern:*

Be it known that I, MICHAEL FRY, of Bloomington, in the county of McLean and State of Illinois, have invented certain new and useful Improvements in Grass-Gathering Attachments for Lawn-Mowers; and I do hereby declare the following to be a full, clear, and exact description of the invention, such as will enable others skilled in the art to which it appertains to make and use the same.

My invention relates to a new and improved grass gathering attachment for lawn mowers, and particularly to that class in which is employed a grass receptacle which is connected to the rear of the mower and provided with an elevating belt or carrier which receives the grass from the mower as it is cut, and carries it to the receptacle.

The object of my present invention is to construct the grass carrier or elevator in such manner that the same may be readily removed for cleaning or repairs; to provide improved means for driving or actuating said carrier; to provide improved means for dumping the grass, and to simplify and improve the various details of construction.

To these ends my invention consists in the novel construction and arrangement of parts hereinafter fully described and afterward definitely pointed out in the claims following this specification, due reference being had to the accompanying drawings, wherein—

Figure 1 is a vertical central section of my improved attachment. Fig. 2 is a similar view, the carrier being removed, and the grass receptacle in position for dumping. Fig. 3 is a front view of the attachment, and Fig. 4 a side view of the carrier frame removed. Fig. 5 is a top plan view of the same. Fig. 6 is a detail bottom plan view of the means for attaching the gatherer to the mower, and Fig. 7 an enlarged detail view of one of the ways for supporting the carrier frame.

Referring to the drawings, the letter A indicates the body of the attachment, which is provided at its end with rearward extensions $a$, carrying the grass receptacle B, as hereinafter described.

To each side of the forward portion of the body A are secured guideways C. Said guideways each consist of a bar $c$ grooved for the greater portion of its length, and at about its center is pivotally secured to the body A by means of a bolt $c'$. The bars $c$ are inclined upwardly and rearwardly as shown, and at their upper ends are adjustably secured to the body A by bolts $c^2$, which pass through slotted plates $c^3$, secured to the upper ends of said bar $c$.

D indicates the carrier frame, consisting of two longitudinal bars $d\ d$, connected together near each end by cross-bars $d'\ d'$, the ends $d^2\ d^2$, of which project beyond the side bars $d\ d$ for the purpose hereinafter described.

In the bars $d\ d$, and near each end thereof are journaled shafts E E', upon each of which are rigidly keyed three pulleys $e\ e'$, $e^2$.

F indicates the carrier consisting of three belts $f f'\ f^2$, mounted on the pulleys $e\ e'$, $e^2$, and having secured thereto by rivets, or other suitable fastenings, slats or cross-bars G, which are arranged at uniform distances apart. To the belts $f f'$, $f^2$ is secured a canvas apron H, to prevent the dropping of the grass as hereinafter made apparent. The upper ends of the bars $d\ d$ are slotted as shown, and the journals E$^2$ of the shaft E are arranged therein and made adjustable by set screws E$^3$ to tighten the belts $f f'$, $f^2$. The ends of said belts are secured together by hinges $f^3$ to permit said belts to freely pass around the pulleys.

To the carrier frame D are secured two longitudinal strips I, I, which serve as guides for the carrier. When the carrier frame and carrier are in position the projecting ends $d^2\ d^2$ of the cross-bars $d'\ d'$ rest in the guideways C, and hold the carrier frame in place, while at the same time permitting the said frame, together with the carrier, to be bodily removed without disarranging any of the parts.

K indicates a shaft mounted in bearings connected to the rear end of the mower, and having rigidly keyed thereon at its center a toothed or ratchet wheel $k$. Said shaft is geared to the driving mechanism of the motor by any suitable form of gearing, and is driven thereby. Each of the slats or cross-bars G at its center is provided with a wear plate $g$, consisting of a U-shaped metallic plate, riveted or otherwise secured to the slats G, and when the carrier frame D is in its proper place the teeth of the ratchet wheel K will successively engage the slats G and cause the carrier F to travel about the pulleys $e\ e'$, $e^2$ to carry the grass from the mower to the receptacle B. The wear plates $g$ are for the purpose of preventing injury or wear to the slats G by the teeth of the ratchet wheel K.

Secured to the sides of the body A and disposed over the guideways C are guard plates L L preferably formed of thin sheet metal, and inclined downwardly toward the carrier. Said guard plates serve to cause any grass falling beyond the sides of the carrier frame to drop down upon the carrier and be conveyed to the receptacle B, and also serve to prevent grass from dropping between the carrier and the body, and thus clog the machine. They also serve to protect the guideways C from becoming filled or clogged with grass or dirt.

The grass receptacle B consists of a rectangular box in the rear upper corners of which are journaled the ends of a metallic bracket M. The bracket M extends down alongside each side of the receptacle B, and thence forward over the extensions $a$ of the body A, and around in front of the receptacle. The bracket M slides in staples N, N, secured in the extensions $a$, and when it is desired to dump the receptacle, the same is pulled rearwardly, the bracket M sliding in the staples N, N, and is then tilted over backward on said bracket, its contents dropping into a basket or other suitable receptacle. To facilitate the dumping I attach a cord or rope O to the forward upper portion of the receptacle B, as shown.

The attachment is connected to the frame carrying the shaft K as follows:—P indicates a metallic rod turned up at each end to form hooks, one end of said rod being secured to the bottom of the body A by staples $p$, and the hooked end driven therein, the other portion of the rod being bent inwardly and up over the tubular bearings K' of the shaft K, the extreme hooked end being passed up through a perforated lug R, projecting from the frame carrying the shaft K. It will be understood that there are two such rods, one upon each side of the attachment. If desired, metallic straps S may also be bolted to the body A and to the frame carrying the shaft K, to afford additional strength to the connection.

From the foregoing description, the operation of my improved grass gathering attachment will be obvious. As the mower is causd to travel forward in cutting the grass it carries with it the attachment and drives the shaft K carrying the gear wheel $k$, which in turn causes the carrier F to travel over the pulleys $e\ e'\ e'$. The grass, as it is cut, drops upon said carrier and is dropped into the receptacle C, which, when it becomes full is pulled out and tilted over backward, and the grass dumped into a basket or other suitable receptacle and removed.

For the purpose of repairs or cleaning, the carrier frame and carrier can be quickly removed and replaced without disturbing or disarranging any of the parts, and without the aid of a skilled mechanic, and by means of the bolts $c^2$ and slotted plates $c^3$, the guideways C can be adjusted to cause the ratchet wheel $k$ to properly engage the slots G of the carrier.

Having described my invention, what I claim is—

1. In a grass gathering attachment for lawn mowers, the combination with the body A, having secured thereto guideways C, and provided with a grass receptacle, of the carrier frame D removably supported in said guideways and carrying an endless carrier, and means for driving said carrier, substantially as described.

2. In a grass gathering attachment for lawn mowers, the combination with the body A, having secured thereto guideways C and provided with a grass receptacle, of the carrier frame D removably supported in said guideways and carrying pulleys $e\ e'\ e^2$, endless belts $f\ f'\ f^2$, mounted on said pulleys and carrying transverse slats G, and the drive shaft K having mounted thereon a gear wheel $k$ successively engaging said slats, substantially as described.

3. In a grass gathering attachment for lawn mowers, the combination with the body A having secured thereto guideways C and provided with a grass receptacle, of the carrier frame D removably supported in said guideways and consisting of the longitudinal bars $d\ d$, and cross-bars $d'\ d'$, the ends of the latter projecting beyond the sides of the bars $d\ d$, and resting in the said guideways, pulleys $e\ e'\ e^2$, carried by said frame, the carrier F mounted on said pulleys, the apron H secured to the carrier frame, and means for driving said carrier, substantially as described.

4. In a grass gathering attachment for lawn mowers, the combination with the body A provided with a grass receptacle, of the carrier frame D carrying pulleys, $e\ e'$, $e^2$, the carrier F consisting of belts $f\ f'$, $f^2$, mounted on said pulleys and having secured thereto transverse slats G, and wear plates $g$, secured to said slats, and the shaft K carrying the gear wheel $k$, engaging said slats, substantially as described, and for the purpose specified.

5. In a grass gathering attachment for lawn mowers the combination with the body A provided with a grass receptacle, of the carrier frame D carrying an endless carrier, mechanism for driving said carrier frame, and the guard plates L secured to the sides of the body A and inclined inwardly over the edges of the carrier and carrier frame, substantially as described, and for the purpose specified.

6. In a grass gathering attachment for lawn mowers, the combination with the body A having pivotally secured thereto adjustable guideways C, and provided with a grass receptacle, of the carrier frame D removably supported in said guideways and carrying an endless carrier, and means for driving said carrier, substantially as described.

In testimony whereof I have signed this specification in the presence of two subscribing witnesses.

MICHAEL FRY.

Witnesses:
   JOHN A. STERLING,
   SAIN WELTY.